United States Patent [19]

Periwal et al.

[11] Patent Number: 5,644,768
[45] Date of Patent: Jul. 1, 1997

[54] SYSTEMS AND METHODS FOR SHARING RESOURCES IN A MULTI-USER ENVIRONMENT

[75] Inventors: Damodar Das Periwal; Manish Maheshwari, both of Campbell, Calif.

[73] Assignee: Borland International, Inc., Scotts Valley, Calif.

[21] Appl. No.: 353,490

[22] Filed: Dec. 9, 1994

[51] Int. Cl.⁶ .................................................. G06F 9/00
[52] U.S. Cl. .................................................. 395/672
[58] Field of Search ............................... 395/650, 700, 395/375, 672; 364/200

[56] References Cited

U.S. PATENT DOCUMENTS

| | | | |
|---|---|---|---|
| 4,594,656 | 6/1986 | Moffett | 364/200 |
| 4,714,996 | 12/1987 | Gladney et al. | 364/300 |
| 4,847,754 | 7/1989 | Obermarck | 364/200 |
| 4,887,204 | 12/1989 | Johnson et al. | 364/200 |
| 4,897,781 | 1/1990 | Chang et al. | 364/200 |
| 5,072,378 | 12/1991 | Manka | 395/575 |
| 5,113,519 | 5/1992 | Johnson et al. | 395/600 |
| 5,133,075 | 7/1992 | Risch | 395/800 |
| 5,151,989 | 9/1992 | Johnson et al. | 395/600 |
| 5,263,165 | 11/1993 | Janis | 395/725 |
| 5,265,235 | 11/1993 | Sindhu et al. | 395/425 |
| 5,285,528 | 2/1994 | Hart | 395/725 |
| 5,287,521 | 2/1994 | Nitta et al. | 395/725 |
| 5,319,780 | 6/1994 | Catino et al. | 395/600 |
| 5,327,556 | 7/1994 | Mohan et al. | 395/600 |
| 5,388,196 | 2/1995 | Pajak et al. | 395/135 |
| 5,442,758 | 8/1995 | Slingwine | 395/375 |
| 5,452,459 | 9/1995 | Druny | 395/700 |

FOREIGN PATENT DOCUMENTS

WO91/03024  3/1991  WIPO .

OTHER PUBLICATIONS

"Unix System Programming" by Keith Haviland & Ben Salama. (Addison–Wesely Publishg company, 1987).

"Advance Window NT" by Jeffrey Richter (Microsoft Press 1994).

"Advanced Unix Programming by Marc J. Rochkind" (Prentice Hall Inc. 1985).

"Modern Operating System" by Andrew S. Tanenbaum Prentice–Hall Inc. 1992.

Symborski, C., *Updating Software and Configuration Data In A Distributed Communications Network*, IEEE 1988 Publication, pp. 331–338.

Finkel, R., *An Operating Systems Vade Mecum, Second Edition*, Prentice Hall, Chapter 8, pp. 274–312.

Date, C., *An Introduction to Database Systems*, Volumes I, Fifth Edition, Addison–Wesley, 1990, pp. 275–288.

*Primary Examiner*—Alvin E. Oberley
*Assistant Examiner*—Alice Y. Park
*Attorney, Agent, or Firm*—John A. Smart; Michael J. Ritter

[57] ABSTRACT

Multi-user system includes a server connected to one or more workstations or "clients" through a computer network. System provides concurrent access to shared resources (e.g., common data structures residing on the server), but without the disadvantage attendant with conventional mutual exclusive (mutex) primitives. Specifically, the system provides a "nested mutex" mechanism, so that user program code can acquire and release mutexes without concern for deadlocking and without special processing for testing a particular mutex condition or state. At the same time, the system prevents other threads or processes from accessing the shared resource in a manner which would violate concurrency.

29 Claims, 7 Drawing Sheets

SYSTEMS AND METHODS FOR SHARING RESOURCES IN A MULTI-USER ENVIRONMENT

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to data processing environments and, more particularly, to systems for accessing shared information and other resources, such as in a multi-user database system.

Computers are a powerful tool for the acquisition and processing of information. Computerized databases, which can be regarded as a kind of electronic filing cabinet or repository for collecting computerized data files, are particularly adept at processing vast amounts of information. As such, these systems serve to maintain information in database files or tables and make that information available on demand.

Between the actual physical database itself (i.e., the data actually stored on a storage device) and the users of the system, a database management system or DBMS is provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Addison-Wesley, 1990; the disclosure of which is hereby incorporated by reference.

Of particular interest to the present invention are those information processing systems which are operative in a shared fashion, i.e., by multiple users (or multiple processes) at a given time. A multi-user database implemented on a client/server platform is one such system. Typically, information sharing or connectivity between the users is provided by a computer network, which comprises several computers connected together as a group. At least one of the computers functions as a "server," providing network services to "clients" (other computers) connected to the network. In this manner, valuable information and resources, including programs, information tables, memory, disk space, printers, and the like, may be shared by several users.

In a multi-user environment, availability of current information to each user is an important consideration. To achieve this, these systems store data objects to be shared (e.g., records of a database file) at a single (logical) location, typically resident on the server. Each user receives access to this centrally-stored information by commanding processes which issue requests to the server for retrieving information of interest. Once received at the client computer, this information may be modified by the client's user and then posted back to the server.

Of course the touchstone of a multi-user environment is sharing; the same holds true for multi-threaded and multi-processing environments. No one user or process can be given access to a given object for long periods of time to the exclusion of others. This is particularly true in a multi-threaded application or in a system which employs multiple processes which have to share certain data structures.

The effectiveness of multi-threaded systems depends in large part on the correct management of concurrency. Data structures, if they are to be shared, should not be accessed in incompatible modes concurrently. Specifically, when one process is accessing a particular data structure, another thread or process should not be updating that data structure at the same time. Even though concurrent "read" access may be granted to multiple processes/threads, efficient implementation results by allowing just one process/thread access to the shared data structure at a time. This way one can avoid building and maintaining queues of different access requests in various access modes. Besides, an access to a shared data structure is typically a quick operation under system control. Therefore, some type of control is required so that they can mutually exclude each other when one of them is executing some program code which is accessing that shared data structure.

The situation is somewhat analogous to "locking." In such an environment, multiple threads or processes may have shared locks, for concurrent "read" access to a particular resource. Unlike conventional locking techniques, however, concurrent access among multiple threads does not employ locking techniques for a particular resource or data structure for reasons of efficiency mentioned above. Instead, the system only permits access by one process or thread at a given time. In such an instance, other processes or threads requiring access to the data structure are put into a "sleep" or "wait" state (i.e., placed in a suspended state until the underlying operating or the database management system is ready to grant access to the desired data structure). The end result is that two concurrent activities do not access shared data at the same time.

Typically, operating systems provide primitives, such as "semaphores" and "mutexes" (mutual exclusive), which gives one thread or one process the right to acquire access to the shared data structure, so that it can proceed with processing of that data structure in an exclusive mode. At the conclusion of processing, that one thread or one process releases the mutex or semaphore, thus relinquishing its exclusive access to the data structure. After that point, another thread or process (typically, one which has been waiting for access to the shared data structure) is granted access and may proceed with its processing of the shared data structure, in an exclusive-access fashion.

Mutexes, which may be built on top of semaphores, are a well-known mechanism for controlling access to shared data structures among concurrent processes or threads. They have a pronounced disadvantage, however. Suppose that one process has to acquire a mutex (i.e., access rights to a shared data object or resource) at different locations (e.g., different routines) of program code. In a scenario, different routines of a computer program may need access to a particular shared data structure at various times. An executing program may, for instance, desire to acquire a mutex in routine A as well as in routine B. Although execution of the program may be such that routine A is called (i.e., invoked) directly or routine B is called directly, it is also possible for routine A to call routine B. Conventional mutex facilities fail at that time, as a result of "deadlock." In particular, when the process or thread is executing in routine A, it acquired the mutex; when the thread or process attempts to acquire the mutex in routine B (i.e., while the mutex is still held through routine A), the thread or process will deadlock on itself (i.e., when attempting to acquire the mutex while executing in routine B). In general, routine A may be called recursively (e.g., A→C→D→A) presenting the same problem.

SUMMARY OF THE INVENTION

The present invention includes a multi-user computer system having a server connected through a network to one or more workstations or "clients." This client/server system allows system resources and data objects, including common data structures, to be shared among several clients concurrently.

In a preferred embodiment, the system of the present invention includes a multi-user database management system having multiple processes/threads requiring access to shared data structures. The shared data structures include information residing on a storage device (e.g., memory) of the server which permits multi-processing operation.

The invention includes methods for providing concurrent access to shared data structures residing on the server, but without the disadvantage attendant with conventional mutual exclusive (mutex) primitives. Specifically, the system of the present invention provides new "nested mutex" primitives, so that program code can acquire and release mutexes without concern for deadlocking. At the same time, the system of the present invention prevents other threads or processes from accessing the shared data structure (i.e., in a manner which would violate concurrency).

In an exemplary embodiment, a surrogate or virtual mutex is constructed in the form of a mutex record. The record comprises three fields. The first field is the true or "real" mutex. Thus, this field will store the mutex, directly or indirectly (e.g., handle or pointer to mutex), as furnished by the underlying operating system; additional implementation-specific information may be stored as well. The second field is a mutex ID or identifier for this "surrogate" mutex—that is, a specific instance of the mutex record. This ID is set to a corresponding ID for the thread or process which successfully achieves acquisition of the (underlying) mutex. The third field is a mutex record count which is employed for reference counting purposes.

When a new mutex is acquired from the operating system, that "real" mutex (or a handle or a pointer to it) is stored in the "real" mutex field of the surrogate mutex (i.e., the mutex record); the mutex ID is set equal to the ID for the thread or process achieving acquisition of the mutex; and the mutex count is set equal to one. Later calls to acquire a mutex for a resource, such as those that may occur in a nested fashion, are processed by first checking the ID of the thread or process (currently requesting the mutex) against the mutex ID stored in the mutex record. In the event that the two IDs match, the system simply increments the mutex reference count and permits the thread or process to continue execution.

In a corresponding manner, when a thread or process releases the (surrogate) mutex, the system of the present invention decrements the mutex reference count. The "real" mutex is not released at the level of the operating system, unless the mutex reference count has reached zero. Thus, a thread or process can effectively acquire and release the mutex multiple times. Regardless of how many times the mutex is acquired or released, the thread or process will retain acquisition of the mutex as long as the number of requests for acquisition exceeds the number of releases for that mutex. When the reference count reaches zero, then the system can invoke the corresponding operating system service for releasing the "real" mutex which was held (whereupon the next waiting thread or process acquires the mutex and proceeds with its processing).

The present invention removes the deficiency of current mechanisms which do not allow such nested acquisitions of mutexes. It does it by providing new primitive operations in a user friendly (i.e., transparent) way: The program code simply tries to acquire a particular mutex without regard to whether that mutex has already been acquired (and not relinquished). In this manner, one can create complex applications which require acquisition of mutexes, all without the risk of creating a deadlock condition and without cumbersome program code.

Figure 1A:
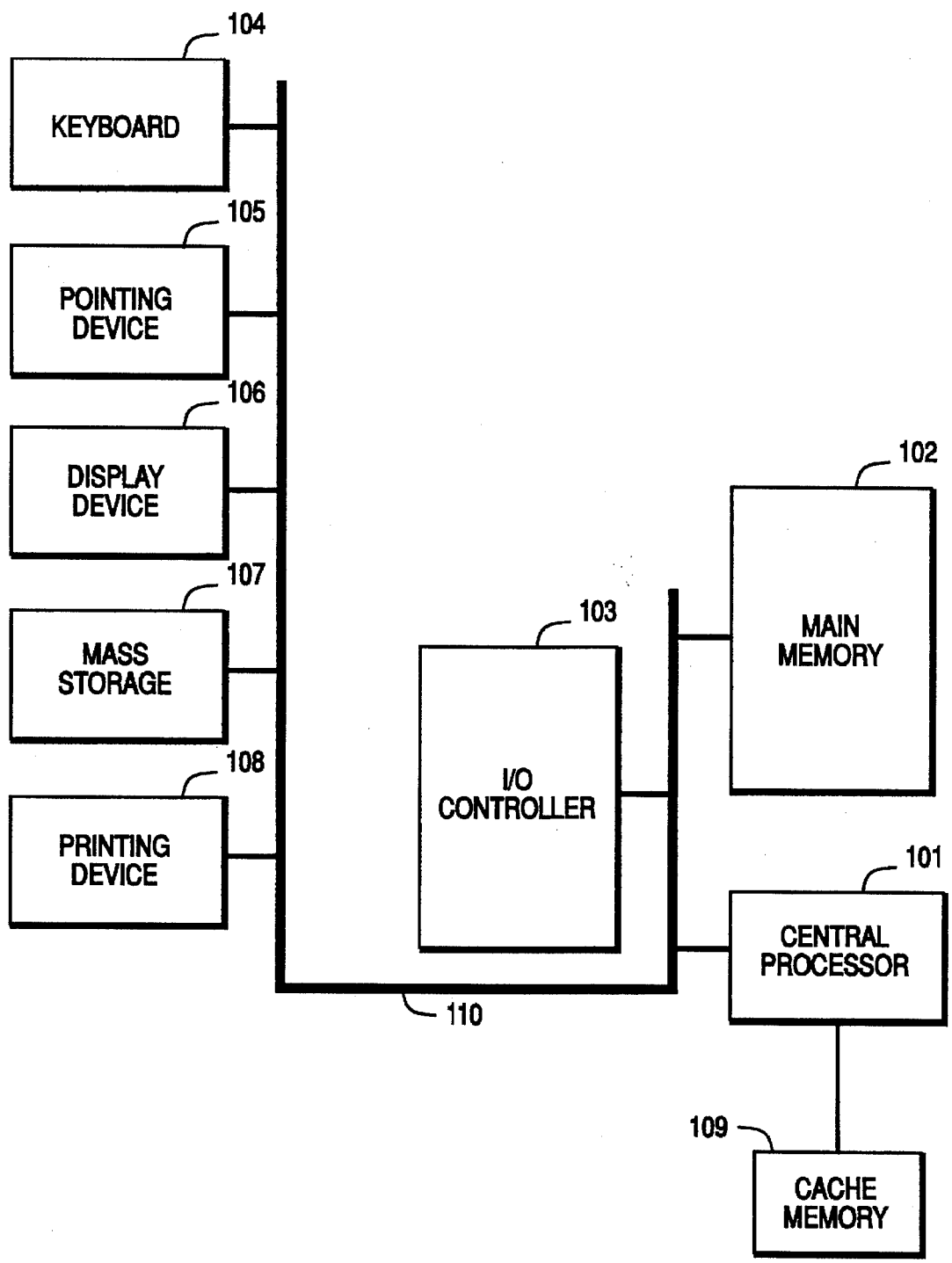
FIG. 1A is a block diagram of a computer system in which the present invention may be embodied.

Glossary access (disk access): To obtain entry to, or to locate, read into memory, and make ready for some operation. Access is used with regard to disks, files, records, and network entry procedures.

allocate: To reserve memory for use by a program. Programs often need certain system resources such as memory or disk space, and they request them as needed from the operating system.

block (storage block): A group of similar things—usually bytes of storage or data. In disk storage, a block is a collection of consecutive bytes of data that are read from or written to the disk as a group.

database: An organized collection of information.

Database Management System (DBMS): System that controls the organization, storage, and retrieval of information in a database.

directory (and subdirectory): A way of organizing and grouping the files on a disk; typically, presented to the user as a catalog for filenames and other directories stored on a disk. What the user views as a directory is supported in the operating system by tables of data, stored on the disk, that contain characteristics associated with each file, as well as the location of the file on the disk.

field: A member of a row that holds a data value associated with an attribute.

file: A file is a conglomeration of instructions, numbers, words, or images stored as a coherent unit which may be operated upon as a unit (e.g., for retrieving, changing, deleting, saving and the like). A disk file is a basic unit of storage that enables a computer to distinguish one set of information from another; it typically includes at least one complete collection of information, such as a program, a set of data used by a program, or the like.

header: Typically the first data in a file, a header stores identity, status, and other data of a file.

input/output: Often abbreviated I/O, input/output refers to the complementary tasks of gathering data for the microprocessor to work with and making the results available to the user through a device such as the display, disk drive, or printer.

location (storage location): The position at which a particular item can be found. A storage location can be an addressed (uniquely numbered) location in memory or it can be a uniquely identified location (sector) on disk.

mutex (mutual exclusion): A programming construct affording exclusive access to a shared resource, object, or the like (e.g., common data structure).

process: A program or portion thereof, typically comprising a coherent sequence of steps.

read (disk read): Read is the operation of receiving input into the computer from a peripheral device, such as a disk. A read is an I/O operation: data is being output from the peripheral device and input into the computer.

referencing: Addressing or otherwise targeting a desired object (e.g., file) at a particular (addressable) location.

resource: Any part of a computer system or network, (e.g., program object, disk drive, printer, memory, and the like) that can be allotted to a program or a process while it is running.

row/record: Physically, a row is usually a record in a data file. Logically, a row is one horizontal member of a table: a collection of fields.

semaphore: An indicator, such as a flag, used to govern access to shared system resources, for maintaining order among processes that are competing for use of resources.

storage device: Any apparatus for recording information in permanent or semipermanent form. Most commonly refers to a disk drive.

table: A structure that contains information. Usually, a collection of rows all stored in one logical file.

thread: A process that is part of a larger process or program.

write (disk write): To transfer information either to a storage device, such as a disk, or other output device. A disk write transfers information from memory to storage on disk.

DETAILED DESCRIPTION OF A PREFERRED EMBODIMENT

The following description will focus on embodiment of the present invention in a multi-user database environment. Application of the present invention is particularly advantageous in those environments requiring access to data in a shared fashion, such as in a multi-user or multi-tasking database system. The present invention is, however, not limited to any particular exemplary embodiment. Instead, the teachings of the present invention may be advantageously applied to a variety of architectures, including but not limited to operating systems. Therefore, the following preferred embodiment and certain alternatives are offered for purposes of illustration and not limitation.

As used herein, the term "database" and "table" refers to any file or collection of files that are used to store information or other data. For example, a spreadsheet file can be considered a database using the present invention. In addition, a database can be a remote object such as data on a remote machine.

General Architecture

The present invention may be embodied on a computer system such as the system 100 of FIG. 1A, which includes a central processor 101, a main memory 102, an input/output controller 103, a keyboard 104, a pointing device 105 (e.g., mouse, track ball, pen device, or the like), a display device 106, and a non-volatile or mass storage 107. Memory 102 includes volatile memory, such as random-access memory or RAM; storage 107 includes non-volatile memory, such as a hard or fixed disk, optical disk, magneto-optical disk, or flash memory. Processor 101, which may be an Intel® 80×86-class microprocessor, includes or is coupled to a cache memory 109 for storing frequently accessed information; memory 109 may be an on-chip cache or external cache (as shown). System 100 may also be provided with additional input/output devices, such as a printing device 108, as desired. The various components of the system 100 communicate through a system bus 110 or similar architecture, as shown.

Figure 1B:
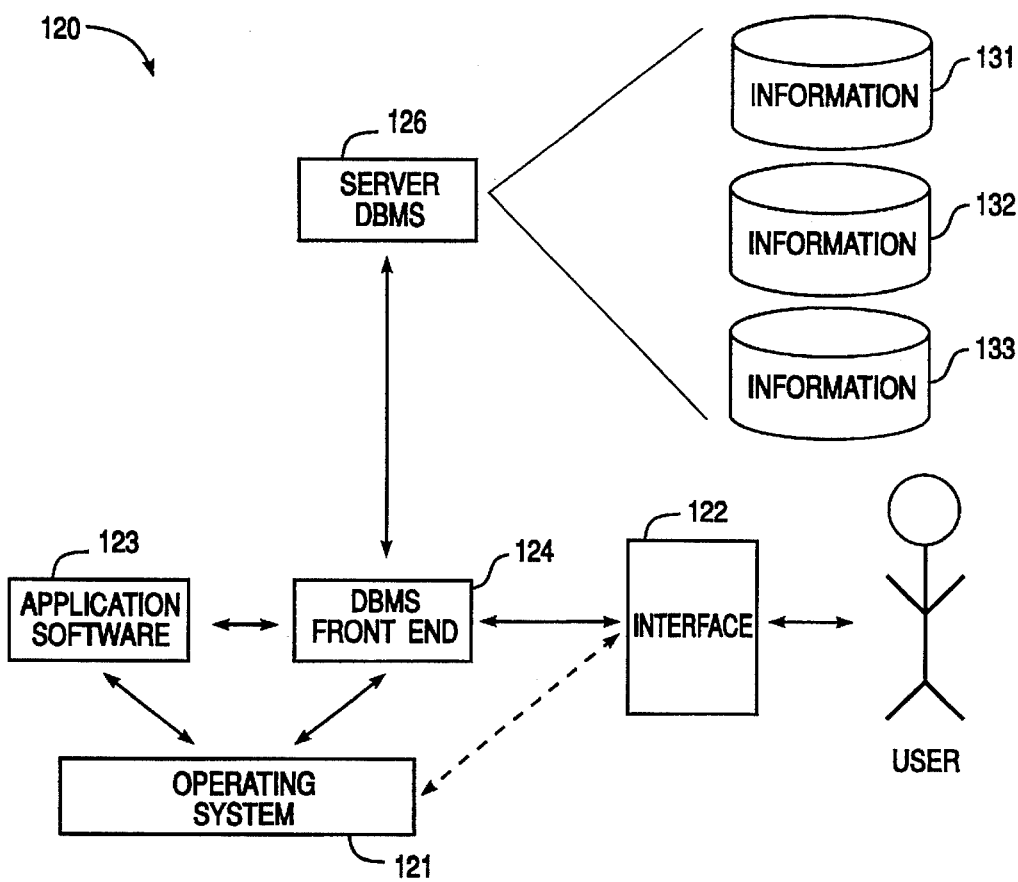
FIG. 1B is a block diagram of a software system, including a database management system (DBMS), which is operative in the computer system of FIG. 1A.

Illustrated in FIG. 1B, a computer software system 120 is provided for programming the operation of the computer system 100. Software system 120, which is stored in system memory 102 and on disk memory 107, includes a kernel or operating system 121 and a DBMS front end 124. OS 121 is the executive or supervisor for the system 100, directing both task management and data management.

DBMS front end 124, on the other hand, is a software subsystem in communication with a server DBMS 126, for storing, retrieving, and manipulating information (e.g., tables 131, 132, 133). Under the command of DBMS front end 124, the system 100 receives user commands and data through user interface 122. Interface 122 may include a built-in query surface or editor for accessing and processing database information. Additional application programs, such as DBMS application software 123, may be "loaded" (i.e., transferred from storage 107 into memory 102) for execution by the system 100, particularly for further controlling the operation of DBMS 124.

In a preferred embodiment, the system 100 is an IBM-compatible personal computer system, available from a variety of vendors (including IBM of Armonk, N.Y.), and operating system 121 is multi-threaded Netware 3.12 or later operating system software, available from Novell of Provo, Utah. Although a client workstation may typically be an MS-DOS machine, the server machine generally runs the DBMS software. The preferred embodiment for the DBMS system requires a multi-threaded or multi-user operating system, such as Windows NT, OS/2, UNIX, or the like. The client may also run on a multi-threaded or multi-user operating system. DBMS front end 124 preferably includes Paradox® for Windows with SQL Links (available from Borland International of Scotts Valley, Calif.). If desired, other operating systems and/or DBMSs (or alternative configurations thereof) may be employed in accordance with the principles of the present invention. In the most preferred embodiment of the present invention, the system 120 operates in a shared environment, such as in a client/server configuration running in a Local Area Network (LAN) environment (described hereinbelow with reference to FIG. 1D).

Figure 1C:
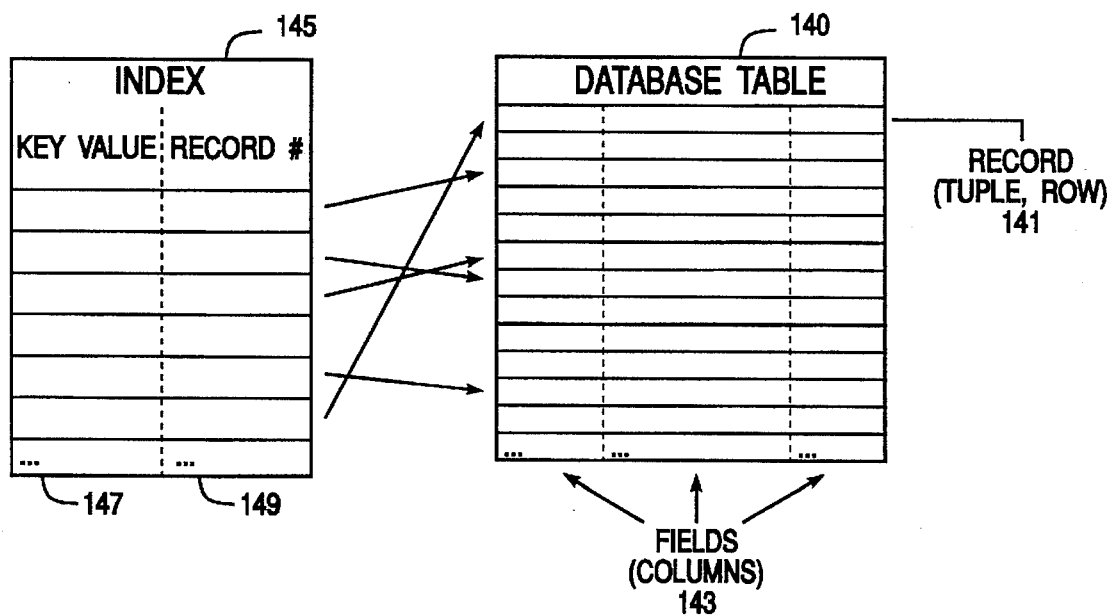
FIG. 1C is a block diagram illustrating a data object, such as database file; an object may have interrelated or dependent data, such as a supporting index.

In a database management system, information is conveniently organized into tables, such as table 140 of FIG. 1C.

As conceptually shown, table 140 typically includes horizontal rows or records (tuples) 141 and vertical columns or fields 143. A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

A given table may be interrelated to other data objects, including for example index, report, and form files. A database index allows the records of a table to be organized in many different ways, depending on a particular user's needs. As shown by index 145 of FIG. 1C, for example, an index may be constructed as a single disk file which is referred to internally by the system for locating and displaying records in a database file. Index 145 stores index key values 147 and unique record numbers 149. The former is a data quantity composed of one or more fields from a record used to arrange (logically) the database file records by some desired order (index expression); the latter are unique pointers to the actual storage location of each record in the database file.

Network Architecture

Figure 1D:
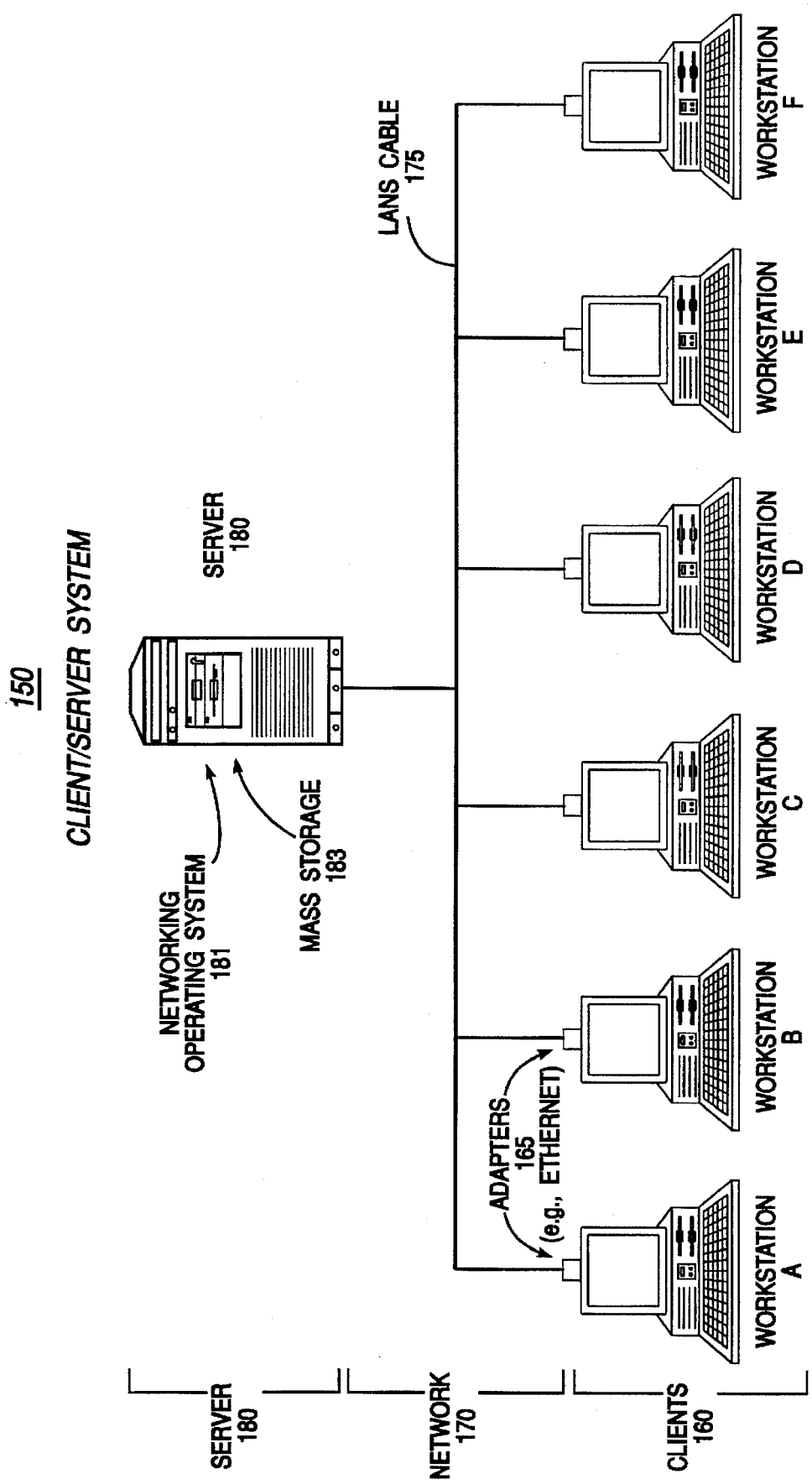
FIG. 1D is a block diagram of a multi-user computing environment, such as a client/server system connected via a Local Area Network (LAN), in which the present invention is most preferably embodied.

While the present invention may operate within a single (standalone) multi-tasking/multi-processing computer (e.g., system 100 of FIG. 1A), the present invention is preferably embodied in a multi-user computer system, such as the client/server system 150 of FIG. 1D which includes system 100. Specifically, system 150 includes a first computer or server 180 and one or more second computers or clients 160. In an exemplary embodiment, the clients or workstations 160 are connected to server 180 through a computer network 170, which may be a conventional Local Area Network (LAN). Network 170 includes cabling or network links 175 for connecting the server and each workstation to the network. The workstations themselves will be similar to or the same as system 100; additionally, each typically includes an adapter 165 (e.g., Ethernet adapter) for receiving the network cable 175. Server 180 may also be similar to or the same as system 100. Because the server manages multiple resources and objects for the clients, it should preferably include a relatively faster processor, larger mass storage, and more system memory than is found on each workstation.

Overall operation of the system 150 is directed by a networking operating system 181, which may be stored in the server's system memory; in a preferred embodiment, OS 181 includes NetWare®, available from Novell of Provo, Utah. In response to requests from the clients 160, the server 180 provides various network resources and services. For instance, multiple users (e.g., workstations A, B, and C) may view a database table stored in server storage 183, while another user (e.g., workstation E) sends a document to a network printer (not shown).

The general construction and operation of a computer network has been well documented in the technical, trade, and patent literature. For a general introduction to a Local Area Network operating under NetWare, see Freed, L. et al., *PC Magazine Guide to Using NetWare*, Ziff-Davis Press, 1991. A more detailed discussion is available in NetWare and accompanying documentation, which is available from Novell of Provo, Utah. For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl Publication Date Mar. 7, 1991. The disclosures of each of the foregoing is hereby incorporated by reference.

Concurrent control over multi-threaded applications

A. Introduction

One possible approach which one may consider to solve the problem is setting a global flag for indicating that the mutex has been acquired and, therefore, no attempt to re-acquire it need be made. In the previously-described example of routines A and B, for instance, when thread or process execution goes from routine A to routine B, no attempt is made in routine B to acquire the mutex in routine B since, at that point, the thread or process already knows (as a result of setting the global flag) that the mutex has already been acquired; thus, no attempt is made in routine B to acquire the mutex. In case of multi-process architecture, the global flag has to be kept in a shared memory and has to be accessed under mutual exclusion. The flag also has to identify who the holder of the mutex is so that in "B" a different thread should not assume that it has the mutex acquired. Although the foregoing approach might work, the resulting user code is cumbersome and prone to error, thus making it impractical to maintain.

The system of the present invention provides a "nested mutex" mechanism, so that user program code can acquire and release mutexes without concern for deadlocking and without special processing for testing a particular mutex condition or state. At the same time, the system of the present invention prevents other threads or processes from accessing the shared data structure (i.e., in a manner which would violate concurrency). Also, nested acquisition of the mutex is provided in a user friendly (i.e., transparent) way: the user code need not include special processing for testing whether a particular mutex has already been acquired. Instead, the approach provided by the present invention allows user code to simply acquire a particular mutex without concern as to whether that mutex has already been acquired (and not relinquished).

B. General operation

At the outset, it is helpful to study a mutex record (rec_mutx) of the present invention, which operates as a recursive mutex structure. In an exemplary embodiment, the record may be constructed as follows (using C programming language):

```
/* Recursive mutex structure */
typedef struct rec_mutx_t
{
    MUTX_T          rec_mutx_mtx [1];
    ULONG           rec_mutx_id;
    SLONG           rec_mutx_count;
} REC_MUTX_T,      *REC_MUTX;
```

As shown, the structure comprises three fields. The first field is the "real" mutex. Thus, this field will store the mutex, directly or indirectly (e.g., handle or pointer to mutex), as furnished by the underlying operating system; additional implementation-specific information may be stored as well. The second field, rec_mutx_ID, is a mutex ID or identifier for this "surrogate" mutex—that is, a specific instance of the mutex record. As described below, this ID is set to a corresponding ID for the thread or process which successfully achieves acquisition of the (underlying) mutex. The third field, rec_mutx_count, is a mutex record count which, as described below, is employed for reference counting purposes. Calls to the underlying operating system service for acquiring a new "real" mutex (i.e., the low-level mutex OS routine) are only made when the mutex count (rec_mutx_count) is zero.

When a new mutex is acquired from the operating system, that mutex (or a handle or a pointer to it) is stored in the "real" mutex field; the mutex ID is set equal to the ID for the thread or process achieving acquisition of the mutex; and the mutex count (rec_mutx_count) is set equal to one. Later calls to acquire the mutex, such as those that may occur in a nested fashion, are processed by first checking the ID of the thread or process (currently requesting the mutex) against the mutex ID (rec_mutx_ID) stored in the mutex record. In the event that the two IDs match, then the system simply increments the mutex reference count (rec_mutx_count) and permits the thread or process to continue execution.

In a corresponding manner, when a thread or process releases the mutex, the system of the present invention decrements the mutex reference count (rec_mutx_count). The "real" mutex is not released at the level of the operating system, unless the mutex reference count has reached zero. Thus, a thread or process can effectively acquire and release the "mutex" multiple times. Regardless of how many times the mutex is acquired or released, the thread or process will retain acquisition of the mutex as long as the number of requests for acquisition exceeds the number of releases for that mutex. When the reference count reaches zero, then the system can invoke the corresponding operating system service for releasing the "real" mutex which was held (whereupon the next waiting thread or process acquires the mutex and proceeds with its processing).

C. Exemplary embodiment: Stored Procedures

Applying the foregoing principles of the present invention, implementation of "stored procedures" (SP) in a multi-client database system can be greatly simplified. A "stored procedure" is a combination of Data Manipulation Language (DML) statements, such as instructions for multiple inserts, updates, selects, or the like. Stored procedures typically have their own programming constructs, such as DO/WHILE, IF/ELSE, and the like. In this fashion, a stored procedure serves as a "mini program" in its own right—one which can be executed by the database engine.

Figure 2:
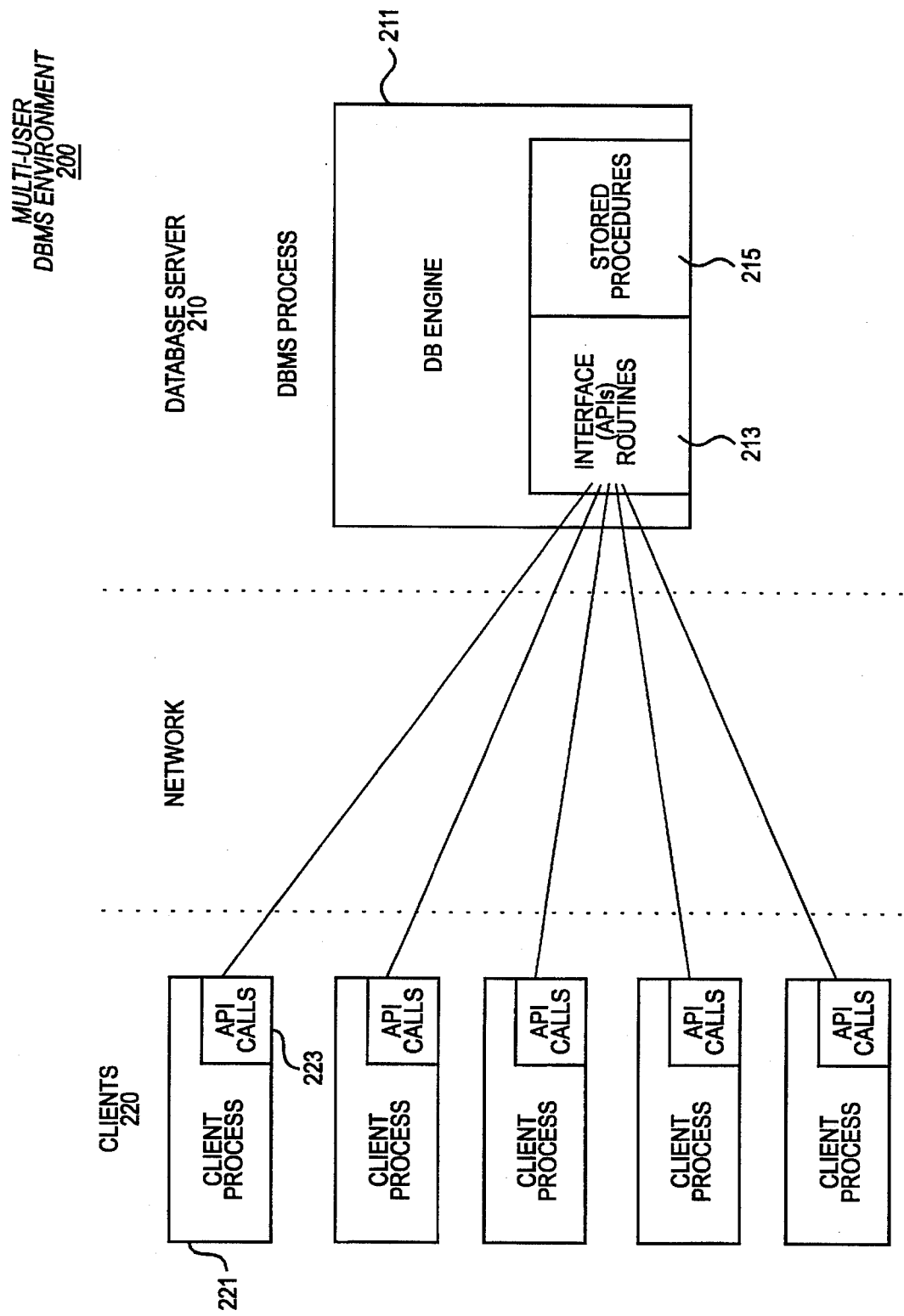
FIG. 2 is a block diagram of the functional relationship between a database server and its many clients.

FIG. 2 illustrates an environment for implementing stored procedures: a database server having one or more clients. Multi-user DBMS environment 200 comprises a database server 210 and one or more clients 220. As shown, a client process 221 (e.g., process executing on a remote workstation) communicates with the database server 210 through a series of API (Application Programming Interface) calls, shown at 223. The calls, in turn, are serviced by a database engine 211, which is operating as a DBMS process on the database server 210. Specifically, the API calls are serviced by engine interface routines, shown at 213. Interface routines 213 provide entry points into the engine 211.

As shown, the database engine 211 stores stored procedures (SP) 215. During operation, multiple clients make API calls into the engine 211, through interface 213. A typical call would comprise, for instance, an SQL (Structured Query Language) call, such as for retrieving a particular set of data records. Certain API calls may also invoke one or more of the stored procedures 215. The approach of shifting processing of a particular chore from one or more clients onto the database server has several advantages. For one, the particular program logic of a stored procedure need not be replicated among the various clients but is, instead, simply stored at a central location on the database server. Moreover, the approach generally decreases network "traffic" (i.e., resource-intensive transmission of large amounts of data across the network). All told, general performance of a multi-user DBMS environment is improved by the use of stored procedures.

In a multi-user database system having stored procedures, a given stored procedure may be invoked by multiple processes. Thus, great pains are taken in conventional systems to make sure that a mutex (e.g., for a particular stored procedure) is obtained only once, so that a deadlock condition is avoided. As a particular problem, one stored procedure can call another stored procedure and so forth and so on, to an arbitrary level of nesting. As a result, when a database system is constructing a data structure for one stored procedure and acquiring a mutex for that purpose, that data structure must have concurrency control in place for denying access to the data structure to other clients. At the same time, however, deadlock must be avoided: the above-described nested call of the stored procedure itself (directly or indirectly) should not lead to deadlock. Thus, store procedures represent one example of building a common or shared data structure using a mutex.

The use of a surrogate, recursive mutex of the present invention handily solves this problem and, at the same time, does not require any special program logic or other processing for the server. In an exemplary embodiment, the "real" mutex is a mutex built on top of the mutex or semaphore provided by the operating system. Regardless of whether the underlying operation system provides a real mutex or semaphore, or one is built on top of what is provided by the operating system, ultimately the operating system provides a valid handle or pointer for access to a shared data structure. This, in turn, is incorporated into the "real" mutex field as a means for accessing the underlying operating system mutex or semaphore.

Figure 3:
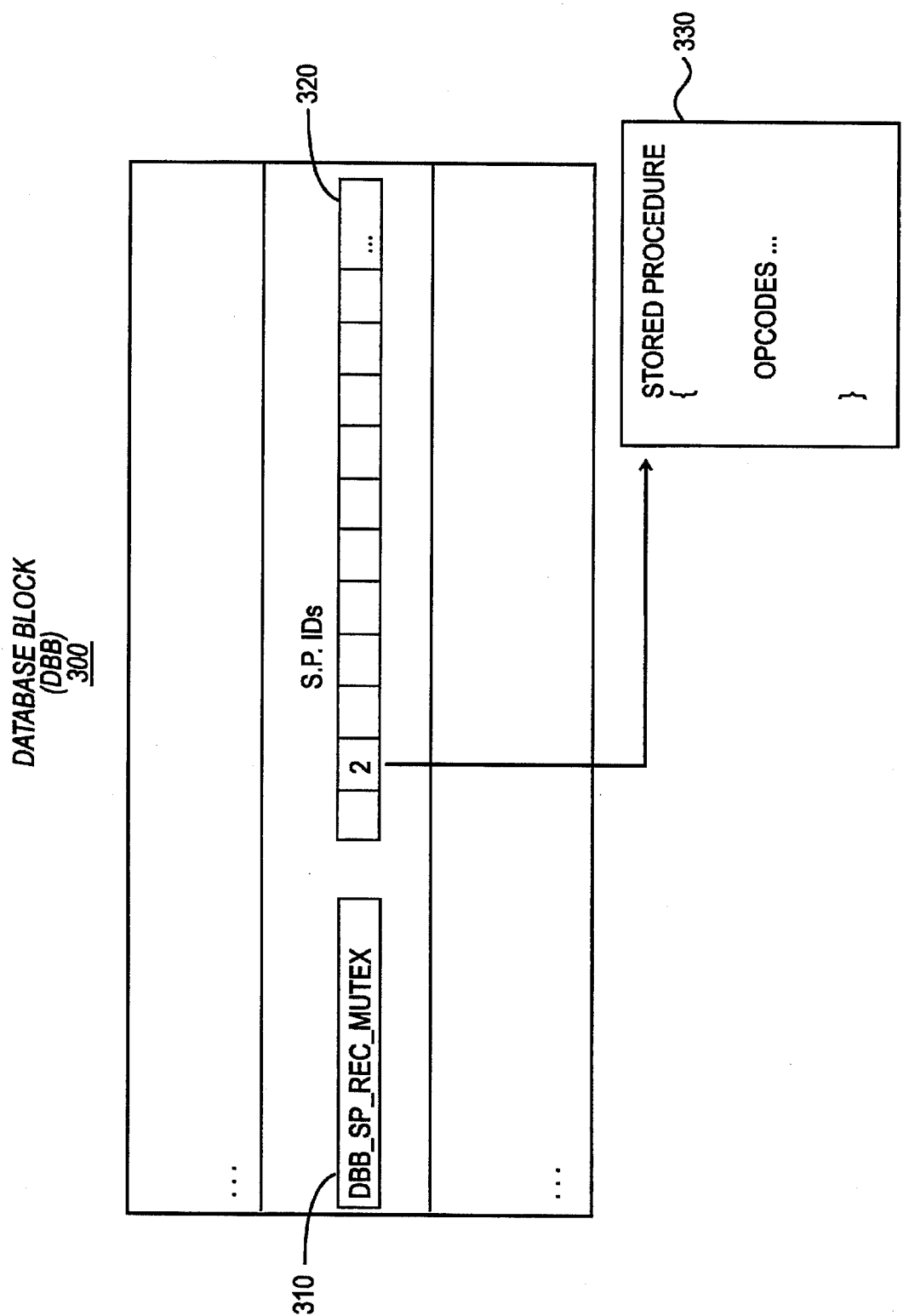
FIG. 3 is a block diagram of a Database Block (DBB) of the present invention which includes a mutex record.

FIG. 3 illustrates maintenance of the mutex record for stored procedures. Each database (i.e., each collection of tables) has associated with it a database block (DBB) 300, as shown in FIG. 3. The DBB is a table storing information about the database so that it may be correctly processed by the database engine 211. The DBB includes a field 310 for storing the mutex record associated with a particular stored procedure or the stored procedure table.

Figure 4A:
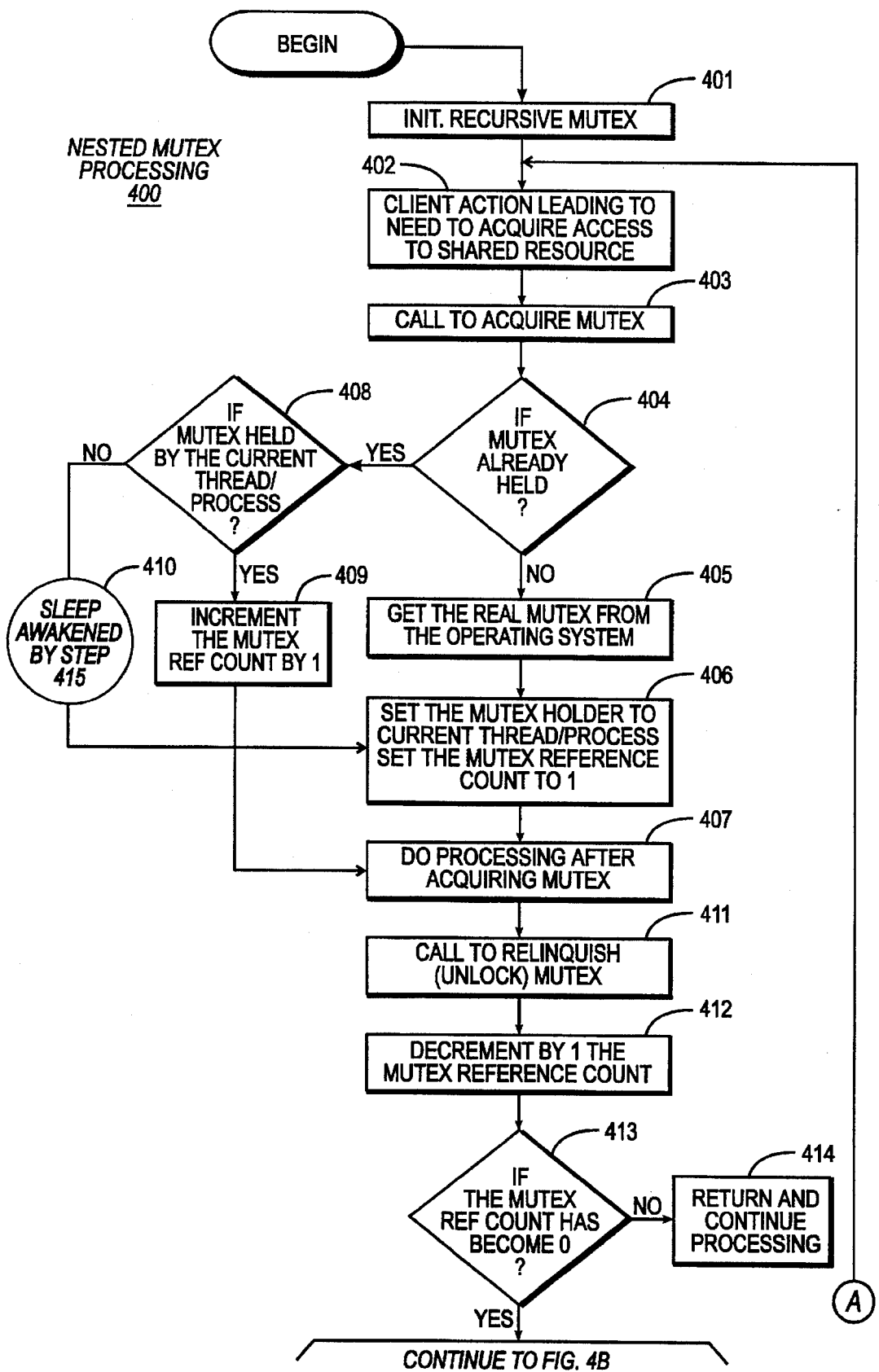
FIGS. 4A–B comprise a flowchart illustrating a method of the present invention for providing nested mutex processing.
Figure 4B:
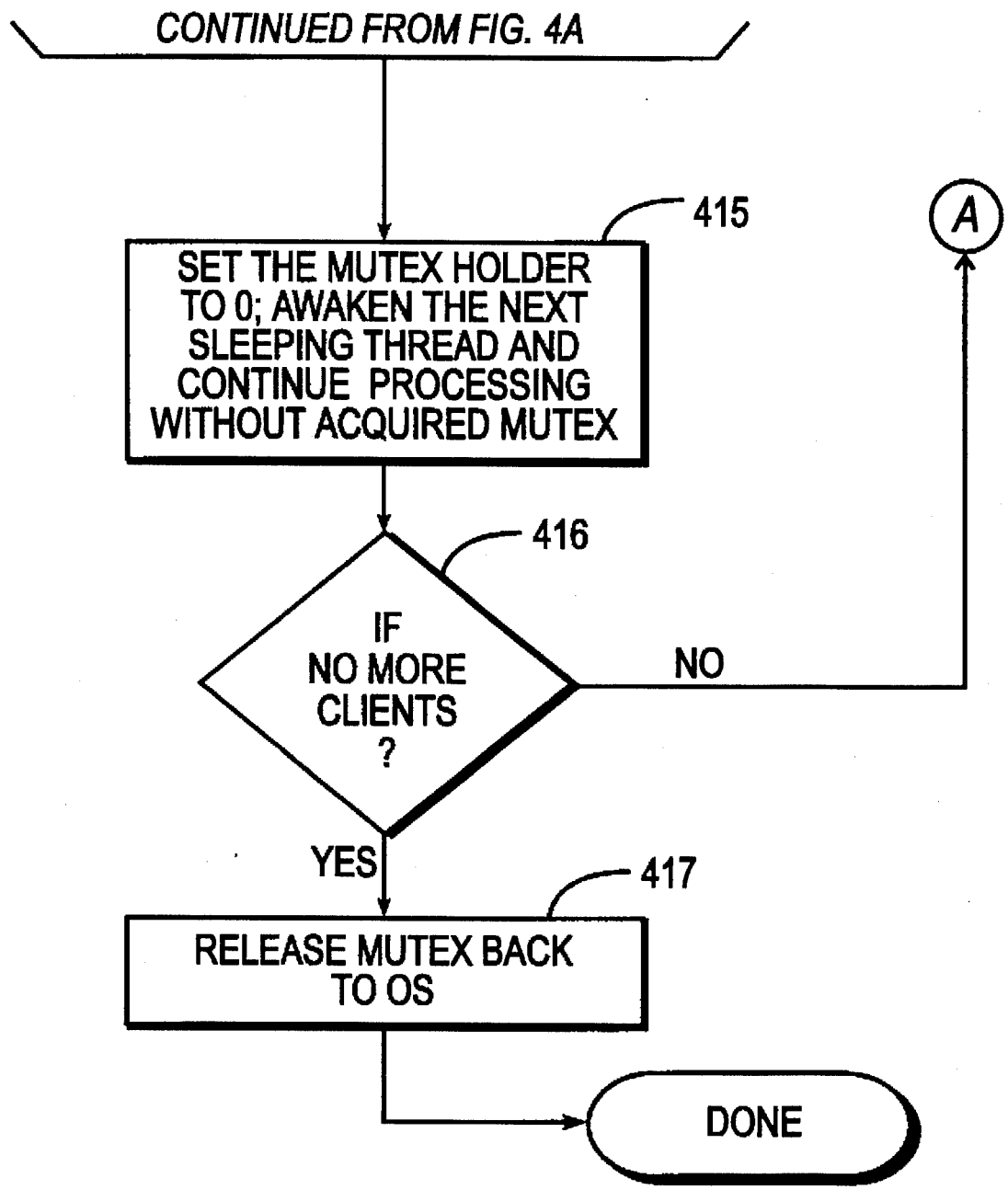

The particular sequence of the operation may be summarized by a flowchart 400, shown in FIGS. 4A-B. At step 401, as the first step, the system initializes the surrogate mutex. Also at this step, the method sets the mutex ID (rec_mutx_ID) to zero (or other flag, e.g., NULL, -1, "blank", or the like), and sets the mutex count (rec_mutx_count) to zero. This initialization step is done only once for a shared data structure. This step is performed by the database engine for all shared objects in a particular database when that database is accessed by a client.

When an API call is received for executing a particular stored procedure (e.g., stored procedure 330), the system will first look up the stored procedure in the "lookup array" 320. If the stored procedure shared data structure is already found there, then it is ready to be used and the system will execute the stored procedure.

In case the stored procedure shared data structure is not found, then it needs to be prepared. At step 402, the need arises for the server process to acquire the mutex. For the database engine to execute that request from the client, the engine must get the mutex in a fashion which protects the shared resource or data structure.

At step 403, a call is made at the engine level to acquire the mutex. If the mutex is already held at step 404, then at step 408 the engine checks whether the current holder of the mutex is the same as the current thread or process (for which this check is being made). If the answer to this is "yes," this gives the current thread or process the right to acquire the mutex. Accordingly, the method need only increment the mutex reference count (step 409) and continue processing at step 407.

If the answer to this is "no," then the method gets the real mutex from the operating system at 405. Then at step 406, the method first sets the mutex holder to the current thread/process and sets the mutex reference count to 1, before continuing processing at step 407.

In the instance where the thread ID for the mutex does not match that for the current process (no at step 408), however, the process is simply put into a wait or "sleep" state (step 410), which will on modern operating systems typically not consume any processor cycles. For a process which has been put into this wait state, it will be awakened when the mutex is freed up (from its use by a prior process/thread).

Step 411 represents a call to the engine by a thread or process for relinquishing (i.e., unlocking) the mutex. This step of unlocking the mutex (i.e., unlocking one reference count worth of the mutex) is accomplished as follows. First, the engine determines whether the current thread ID matches the thread ID stored in the mutex record. If not, then no attempt is made to unlock the mutex (as the process seeking the unlocking does not have appropriate rights). If the IDs match, then the unlocking process continues with the engine decrementing the mutex reference count, at step 412.

In the event that the reference count reaches the value of zero (step 413), the engine frees up the mutex record by setting the mutex ID (rec_mutx_ID) to zero (step 415), for indicating that no task owns the mutex at this instance in time. Finally at this step, the engine may make the appropriate operating system call for freeing up the "real" mutex (i.e., the one maintained by the operating system). If the count is not 0 at step 413, then the method continues processing at step 414.

As indicated by step 415, after the mutex has been completely freed (i.e., its reference count goes to zero), the next sleeping thread may be awakened and granted the mutex. When the sleeping process is awakened, at step 410, it first sets the mutex record ID to the ID for the current thread. Then, it sets the mutex count equal to one. At this point, the mutex is granted to the awakened process so that it may continue execution. As indicated by the loop back to step 407, the awakened thread or process carries out its processing task with the mutex. Once the thread or process has completed its task, it may then free up the mutex (so that it may be acquired by subsequent threads or processes).

Finally, as indicated by steps 416 and 417, once all clients (i.e., processes or threads) are done, the database engine releases the "real" mutex back to the operating system. Thereafter, the method is done.

D. Additional Considerations: Exception Handling

In a preferred embodiment, exception states should preferably be trapped so that the system can provide appropriate mutex cleanup. If a thread or process throws an exception so that the thread or process needs to abandon what it is doing for any reason, then the system should preferably include steps for releasing any mutex held by that thread or process. In a C language embodiment using "setjmp" and "longjmp", for instance, any longjmp's are trapped so that any mutex acquired (in the code associated with the longjmp) are released. In this manner, other threads or processes may acquire the mutex despite the fact that a prior thread or process failed to properly release the mutex (as a result of an abnormal termination/longjmp).

Advantages

Without the present invention, the task of keeping track of whether a mutex has been acquired in such an instance becomes impractical. The present invention, in contrast, affords mutex acquisition in such instances, all in a transparent fashion (i.e., all without the need for the user (programmer) to provide special logic for tracking mutex acquisition). In this manner, the present invention improves greatly on the use of mutexes for classes of applications where mutexes may need to be acquired at different places in the program code, particularly in instances of nested calls among the code.

Attached herewith are source listings providing further description of the present invention, suitable for implementation in a digital computer. The source listings are provided in the C programming language, which is widely described throughout the technical and trade literature. An appropriate development system for compiling and linking C source listings is available from a variety of vendors, including Borland International, Inc. of Scotts Valley, Calif. and Microsoft Corporation of Redmond, Wash.

While the invention is described in some detail with specific reference to a single preferred embodiment and certain alternatives, there is no intent to limit the invention to that particular embodiment or those specific alternatives. For instance, the system 100 may be implemented in other platforms, including Windows NT, Macintosh, Unix, and the like. While the present invention is perhaps best implemented in multi-user systems, those skilled in the art will also appreciate that the present invention may be employed in certain multi-tasking systems as well. Though described in terms of database systems, the invention can be utilized by operating systems to provide a better mutual exclusion facility to the users. Although the system of the present invention requires no dedicated hardware, the described methods may be implemented with a firmware coupled to the system, if desired. Thus, the true scope of the present invention is not limited to any one of the foregoing exemplary embodiments but is instead defined by the appended claims.

Source Code Appendix

Attorney Docket No. 149

```
        /* Copyright (c) 1994 Borland International, Inc. */
        #ifdef _ANSI_PROTOTYPES_
        PRC MET_procedure (
            int           id)
 5      #else
        PRC MET_procedure (id)
            int           id;
        #endif
        {
10      /****************************************
         *
         *     M E T _ p r o c e d u r e
         *
         ****************************************
15       *
         * Functional description
         *    Find or create a procedure block for a given procedure id.
         *    SUPERSERVER is defined for a multi-threaded platform like Netware.
         ****************************************/
20      TDBB    tdbb;
        DBB     dbb;
        PRC     procedure;
        VEC     vector;
        LCK     lock;
25      BLK     request, request2, *ptr, *end;
        CSB     csb;
        PRM     parameter;
        PLB     old_pool;
        NOD     node;
30      FMT     format;
        DSC     *desc;
        SSHORT       i;
        USHORT       length;
        JMP_BUF env, *old_env;
35
        tdbb = GET_THREAD_DATA;
        dbb =  tdbb->tdbb_database;

40      // Mem alloc
        // ...

// Look for stored proc ID in current list of stored procedures
        #ifdef SUPERSERVER
45      if ((procedure = (PRC) vector->vec_object [id]) &&
                !(procedure->prc_flags & (PRC_being_scanned |
        PRC_being_altered)))
                // if found, return
            return procedure;
50
        if (!(dbb->dbb_flags & DBB_sp_rec_mutex_init))
            {
            // Init for first time
            THD_rec_mutex_init (&dbb->dbb_sp_rec_mutex);
55          dbb->dbb_flags |= DBB_sp_rec_mutex_init;
            }
        THREAD_EXIT;

// Make call to get Mutex
60      if (THD_rec_mutex_lock (&dbb->dbb_sp_rec_mutex))
            {
            THREAD_ENTER;
            // return NULL if fail
            return NULL;
65          }

// At this point, have valid Mutex
```

```
                // Do processing

THREAD_ENTER;
                #endif /* SUPERSERVER */
    5           if ((procedure = (PRC) vector->vec_object [id]) &&
                    !(procedure->prc_flags & PRC_being_altered))
                {
                    // Stored procedure has already been init'd
                #ifdef SUPERSERVER
   10               // Then just release for this Mutex rec.
                    THD_rec_mutex_unlock (&dbb->dbb_sp_rec_mutex);
                #endif
                    return procedure; // ret ptr to stored proc
                }
   15
                #ifdef SUPERSERVER
                old_env = (JMP_BUF*) tdbb->tdbb_setjmp;
                tdbb->tdbb_setjmp = (UCHAR*) env;
                if (SETJMP (env))
   20           {
                    // Clean up (in the event of failure (e.g., longjmp)
                    THD_rec_mutex_unlock (&dbb->dbb_sp_rec_mutex);
                    tdbb->tdbb_setjmp = (UCHAR*) old_env;
                    ERR_punt ();
   25           }
                #endif // Create stored proc data struct
                // implementation specific details
   30
                // May result in nested call to MET_procedure
                // because may encounter another S.P. call within this
                // S.P.

35           // This approach allows the call to go through -- avoid deadlock
                // (which would have occurred using normal Mutex implementation)

// ...

40           // Release Mutex
                THD_rec_mutex_unlock (&dbb->dbb_sp_rec_mutex);
                #ifdef SUPERSERVER
                tdbb->tdbb_setjmp = (VCHAR*) old_env;
                #endif
   45           return procedure;
                }

/*=====================================*/
                #ifdef ANY_THREADING
   50           #ifdef APOLLO
                #define THREAD_MUTEXES_DEFINED
                #ifdef _ANSI_PROTOTYPES_
                int THD_mutex_destroy (
                    MUTX_T *mutex)
   55           #else
                THD_mutex_destroy (mutex)
                    MUTX_T *mutex;
                #endif
                {
   60           /***************************************
                 *
                 *    T H D _ m u t e x _ d e s t r o y    ( A p o l l o )
                 *
                 ***************************************
   65            *
                 * Functional description
                 *
```

```
                        *************************************/
            return 0;
            }
            /*====================================*/
            #ifdef _ANSI_PROTOTYPES_
            int THD_mutex_init (
                MUTX_T  *mutex)
            #else
            THD_mutex_init (mutex)
                MUTX_T  *mutex;
            #endif
            {
            /*************************************
             *
             *     T H D _ m u t e x _ i n i t         ( A p o l l o )
             *
             *************************************
             *
             * Functional description
             *
             *************************************/ mutex_$init (mutex);

return 0;
            }
            /*====================================*/
            #ifdef _ANSI_PROTOTYPES_
            int THD_mutex_lock (
                MUTX_T  *mutex)
            #else
            THD_mutex_lock (mutex)
                MUTX_T  *mutex;
            #endif
            {
            /*************************************
             *
             *     T H D _ m u t e x _ l o c k         ( A p o l l o )
             *
             *************************************
             *
             * Functional description
             *
             *************************************/ mutex_$lock (mutex, mutex_$wait_forever);

return 0;
            }
            /*====================================*/
            #ifdef _ANSI_PROTOTYPES_
            int THD_mutex_unlock (
                MUTX_T  *mutex)
            #else
            THD_mutex_unlock (mutex)
                MUTX_T  *mutex;
            #endif
            {
            /*************************************
             *
             *     T H D _ m u t e x _ u n l o c k     ( A p o l l o )
             *
             *************************************
             *
             * Functional description
             *
```

```
                        ***********************************/
            mutex_$unlock (mutex);
5           return 0;
            }
            #endif
            #endif
            /*=======================================*/
10          #ifdef ANY_THREADING
            #ifdef OS2_ONLY
            #define THREAD_MUTEXES_DEFINED
            #ifdef _ANSI_PROTOTYPES_
            int THD_mutex_destroy (
15              MUTX_T  *mutex)
            #else
            THD_mutex_destroy (mutex)
                MUTX_T  *mutex;
            #endif
20          {
            /*************************************
             *
             *      T H D _ m u t e x _ d e s t r o y     ( O S 2 )
             *
25          *************************************
             *
             * Functional description
             *
             *************************************/
30
            return DosCloseMutexSem (mutex->mutx_mutex);
            }
            /*=======================================*/
            #ifdef _ANSI_PROTOTYPES_
35          int THD_mutex_init (
                MUTX_T  *mutex)
            #else
            THD_mutex_init (mutex)
                MUTX_T  *mutex;
40          #endif
            {
            /*************************************
             *
             *      T H D _ m u t e x _ i n i t         ( O S 2 )
45           *
             *************************************
             *
             * Functional description
             *
50          *************************************/ return DosCreateMutexSem (NULL, &mutex->mutx_mutex, 0, 0);
            }
            /*=======================================*/
55          #ifdef _ANSI_PROTOTYPES_
            int THD_mutex_lock (
                MUTX_T  *mutex)
            #else
            THD_mutex_lock (mutex)
60              MUTX_T  *mutex;
            #endif
            {
            /*************************************
             *
65           *      T H D _ m u t e x _ l o c k         ( O S 2 )
             *
             *************************************
```

```
 *
 * Functional description
 *
 **************************************/ return DosRequestMutexSem (mutex->mutx_mutex, SEM_INDEFINITE_WAIT);
}
/*=====================================*/
#ifdef _ANSI_PROTOTYPES_
int THD_mutex_unlock (
    MUTX_T  *mutex)
#else
THD_mutex_unlock (mutex)
    MUTX_T  *mutex;
#endif
{
/***************************************
 *
 *     T H D _ m u t e x _ u n l o c k       ( O S 2 )
 *
 ***************************************
 *
 * Functional description
 *
 **************************************/ return DosReleaseMutexSem (mutex->mutx_mutex);
}
#endif
#endif
/*=====================================*/
#ifdef ANY_THREADING
#ifdef POSIX_THREADS
#define THREAD_MUTEXES_DEFINED
#ifdef _ANSI_PROTOTYPES_
int THD_mutex_destroy (
    MUTX_T  *mutex)
#else
THD_mutex_destroy (mutex)
    MUTX_T  *mutex;
#endif
{
/***************************************
 *
 *     T H D _ m u t e x _ d e s t r o y     ( P O S I X )
 *
 ***************************************
 *
 * Functional description
 *
 **************************************/ return pthread_mutex_destroy (mutex);
}
/*=====================================*/
#ifdef _ANSI_PROTOTYPES_
int THD_mutex_init (
    MUTX_T  *mutex)
#else
THD_mutex_init (mutex)
    MUTX_T  *mutex;
#endif
{
/***************************************
 *
 *     T H D _ m u t e x _ i n i t           ( P O S I X )
 *
```

```
/************************************
 *
 * Functional description
 *
 ************************************/ return pthread_mutex_init (mutex, pthread_mutexattr_default);
}
/*======================================*/
#ifdef _ANSI_PROTOTYPES
int THD_mutex_lock (
    MUTX_T  *mutex)
#else
THD_mutex_lock (mutex)
    MUTX_T  *mutex;
#endif
{
/************************************
 *
 *    T H D _ m u t e x _ l o c k       ( P O S I X )
 *
 ************************************
 *
 * Functional description
 *
 ************************************/ return pthread_mutex_lock (mutex);
}
/*======================================*/
#ifdef _ANSI_PROTOTYPES
int THD_mutex_unlock (
    MUTX_T  *mutex)
#else
THD_mutex_unlock (mutex)
    MUTX_T  *mutex;
#endif
{
/************************************
 *
 *    T H D _ m u t e x _ u n l o c k     ( P O S I X )
 *
 ************************************
 *
 * Functional description
 *
 ************************************/ return pthread_mutex_unlock (mutex);
}
#endif
#endif
/*======================================*/
#ifdef ANY_THREADING
#ifdef SOLARIS_MT
#define THREAD_MUTEXES_DEFINED
#ifdef _ANSI_PROTOTYPES
int THD_mutex_destroy (
    MUTX_T  *mutex)
#else
THD_mutex_destroy (mutex)
    MUTX_T  *mutex;
#endif
{
/************************************
 *
 *    T H D _ m u t e x _ d e s t r o y    ( S o l a r i s )
```

```
         *
         ****************************************
         *
         * Functional description
         *
         ****************************************/ return mutex_destroy (mutex);
      }
/*========================================*/
#ifdef _ANSI_PROTOTYPES_
int THD_mutex_init (
     MUTX_T  *mutex)
#else
THD_mutex_init (mutex)
     MUTX_T  *mutex;
#endif
{
/****************************************
 *
 *    T H D _ m u t e x _ i n i t        (Solaris)
 *
 ****************************************
 *
 * Functional description
 *
 ****************************************/ return mutex_init (mutex, USYNC_THREAD, NULL);
      }
/*========================================*/
#ifdef _ANSI_PROTOTYPES_
int THD_mutex_lock (
     MUTX_T  *mutex)
#else
THD_mutex_lock (mutex)
     MUTX_T  *mutex;
#endif
{
/****************************************
 *
 *    T H D _ m u t e x _ l o c k        (Solaris)
 *
 ****************************************
 *
 * Functional description
 *
 ****************************************/ return mutex_lock (mutex);
      }
/*========================================*/
#ifdef _ANSI_PROTOTYPES_
int THD_mutex_unlock (
     MUTX_T  *mutex)
#else
THD_mutex_unlock (mutex)
     MUTX_T  *mutex;
#endif
{
/****************************************
 *
 *    T H D _ m u t e x _ u n l o c k    (Solaris)
 *
 ****************************************
 *
 * Functional description
```

```
         *
         *********************************/
        return mutex_unlock (mutex);
     }
     #endif
     #endif
     /*=======================================*/
     #ifdef ANY_THREADING
     #ifdef VMS
     #define THREAD_MUTEXES_DEFINED
     #ifdef _ANSI_PROTOTYPES_
     int THD_mutex_destroy (
          MUTX_T  *mutex)
     #else
     THD_mutex_destroy (mutex)
          MUTX_T  *mutex;
     #endif
     {
     /*************************************
      *
      *    T H D _ m u t e x _ d e s t r o y    ( V M S )
      *
      **************************************
      *
      * Functional description
      *
      **********************************/
        return 0;
     }
     /*=======================================*/
     #ifdef _ANSI_PROTOTYPES_
     int THD_mutex_init (
          MUTX_T  *mutex)
     #else
     THD_mutex_init (mutex)
          MUTX_T  *mutex;
     #endif
     {
     /*************************************
      *
      *    T H D _ m u t e x _ i n i t    ( V M S )
      *
      **************************************
      *
      * Functional description
      *
      **********************************/
        return ISC_mutex_init (mutex, 0);
     }
     /*=======================================*/
     #ifdef _ANSI_PROTOTYPES_
     int THD_mutex_lock (
          MUTX_T  *mutex)
     #else
     THD_mutex_lock (mutex)
          MUTX_T  *mutex;
     #endif
     {
     /*************************************
      *
      *    T H D _ m u t e x _ l o c k    ( V M S )
      *
      **************************************
      *
```

```
 * Functional description
 *
 ***************************************/
return ISC_mutex_lock (mutex);
}
/*=====================================*/
#ifdef _ANSI_PROTOTYPES_
int THD_mutex_unlock (
    MUTX_T   *mutex)
#else
THD_mutex_unlock (mutex)
    MUTX_T   *mutex;
#endif
{
/****************************************
 *
 *   T H D _ m u t e x _ u n l o c k        ( V M S )
 *
 ****************************************
 *
 * Functional description
 *
 ***************************************/
return ISC_mutex_unlock (mutex);
}
#endif
#endif
/*=====================================*/
#ifdef ANY_THREADING
#ifdef WIN_NT
#define THREAD_MUTEXES_DEFINED
#ifdef _ANSI_PROTOTYPES_
int THD_mutex_destroy (
    MUTX_T   *mutex)
#else
THD_mutex_destroy (mutex)
    MUTX_T   *mutex;
#endif
{
/****************************************
 *
 *   T H D _ m u t e x _ d e s t r o y    ( W I N _ N T )
 *
 ****************************************
 *
 * Functional description
 *
 ***************************************/
DeleteCriticalSection (mutex);

return 0;
}
/*=====================================*/
#ifdef _ANSI_PROTOTYPES_
int THD_mutex_init (
    MUTX_T   *mutex)
#else
THD_mutex_init (mutex)
    MUTX_T   *mutex;
#endif
{
/****************************************
 *
 *   T H D _ m u t e x _ i n i t          ( W I N _ N T )
```

```
 *
 **************************************
 *
 * Functional description
 *
 **************************************/

InitializeCriticalSection (mutex);

return 0;
}
/*=====================================*/
#ifdef _ANSI_PROTOTYPES_
int THD_mutex_lock (
    MUTX_T *mutex)
#else
THD_mutex_lock (mutex)
    MUTX_T *mutex;
#endif
{
/**************************************
 *
 *    T H D _ m u t e x _ l o c k        ( W I N _ N T )
 *
 **************************************
 *
 * Functional description
 *
 **************************************/

EnterCriticalSection (mutex);

return 0;
}
/*=====================================*/
#ifdef _ANSI_PROTOTYPES_
int THD_mutex_unlock (
    MUTX_T *mutex)
#else
THD_mutex_unlock (mutex)
    MUTX_T *mutex;
#endif
{
/**************************************
 *
 *    T H D _ m u t e x _ u n l o c k    ( W I N _ N T )
 *
 **************************************
 *
 * Functional description
 *
 **************************************/

LeaveCriticalSection (mutex);

return 0;
}
#endif
#endif
/*=====================================*/
#ifdef ANY_THREADING
#ifdef NETWARE_386
#define THREAD_MUTEXES_DEFINED
#ifdef _ANSI_PROTOTYPES_
int THD_mutex_destroy (
    MUTX_T *mutex)
#else
```

```
          THD_mutex_destroy (mutex)
              MUTX_T  *mutex;
          #endif
          {
 5        /***********************************
           *
           *    T H D _ m u t e x _ d e s t r o y    ( N E T W A R E _ 3 8 6 )
           *
           ***********************************
10         *
           * Functional description
           *
           ***********************************/

15            if (mutex->mutx_mutex != 0)
                  ISC_semaphore_close (mutex->mutx_mutex);

return 0;
          }
20        /*====================================*/
          #ifdef _ANSI_PROTOTYPES_
          int THD_mutex_init (
              MUTX_T  *mutex)
          #else
25        THD_mutex_init (mutex)
              MUTX_T  *mutex;
          #endif
          {
          /***********************************
30         *
           *    T H D _ m u t e x _ i n i t          ( N E T W A R E _ 3 8 6 )
           *
           ***********************************
           *
35         * Functional description
           *
           ***********************************/

ISC_semaphore_open (&mutex->mutx_mutex, 1);
40            return 0;
          }
          /*====================================*/
          #ifdef _ANSI_PROTOTYPES_
          int THD_mutex_lock (
45            MUTX_T  *mutex)
          #else
          THD_mutex_lock (mutex)
              MUTX_T  *mutex;
          #endif
50        {
          /***********************************
           *
           *    T H D _ m u t e x _ l o c k          ( N E T W A R E _ 3 8 6 )
           *
55         ***********************************
           *
           * Functional description
           *
           ***********************************/
60
              return ISC_mutex_lock (&mutex->mutx_mutex);
          }
          /*====================================*/
          #ifdef _ANSI_PROTOTYPES_
65        int THD_mutex_unlock (
              MUTX_T  *mutex)
          #else
```

```
        THD_mutex_unlock (mutex)
             MUTX_T  *mutex;
        #endif
        {
 5      /*************************************
         *
         *   T H D _ m u t e x _ u n l o c k         ( N E T W A R E _ 3 8 6
        )
         *
10       *************************************
         *
         * Functional description
         *
         *************************************/
15
        return ISC_mutex_unlock (&mutex->mutx_mutex);
        }
        #endif
        #endif
20      /*====================================*/
        #ifndef THREAD_MUTEXES_DEFINED
        #ifdef _ANSI_PROTOTYPES_
        int THD_mutex_destroy (
             MUTX_T  *mutex)
25      #else
        THD_mutex_destroy (mutex)
             MUTX_T  *mutex;
        #endif
        {
30      /*************************************
         *
         *   T H D _ m u t e x _ d e s t r o y      ( G e n e r i c )
         *
         *************************************
35       *
         * Functional description
         *
         *************************************/
40      return 0;
        }
        /*====================================*/
        #ifdef _ANSI_PROTOTYPES_
        int THD_mutex_init (
45           MUTX_T  *mutex)
        #else
        THD_mutex_init (mutex)
             MUTX_T  *mutex;
        #endif
50      {
        /*************************************
         *
         *   T H D _ m u t e x _ i n i t           ( G e n e r i c )
         *
55       *************************************
         *
         * Functional description
         *
         *************************************/
60      return 0;
        }
        /*====================================*/
        #ifdef _ANSI_PROTOTYPES_
65      int THD_mutex_lock (
             MUTX_T  *mutex)
        #else
```

```
        THD_mutex_lock (mutex)
            MUTX_T  *mutex;
        #endif
        {
        /*************************************
         *
         *    THD_mutex_lock        (Generic)
         *
         *************************************
         *
         * Functional description
         *
         *************************************/
            return 0;
        }
        /*===================================*/
        #ifdef _ANSI_PROTOTYPES_
        int THD_mutex_unlock (
            MUTX_T  *mutex)
        #else
        THD_mutex_unlock (mutex)
            MUTX_T  *mutex;
        #endif
        {
        /*************************************
         *
         *    THD_mutex_unlock      (Generic)
         *
         *************************************
         *
         * Functional description
         *
         *************************************/
            return 0;
        }
        #endif
        /*===================================*/
        #ifdef SUPERSERVER
        #ifdef _ANSI_PROTOTYPES_
        int THD_rec_mutex_destroy (
            REC_MUTX_T    *rec_mutex)
        #else
        THD_rec_mutex_destroy (rec_mutex)
            REC_MUTX_T    *rec_mutex;
        #endif
        {
        /*************************************
         *
         *    THD_rec_mutex_destroy  (SUPERSERVER)
         *
         *************************************
         *
         * Functional description
         *
         *************************************/
            return THD_mutex_destroy (rec_mutex->rec_mutx_mtx);
        }
        /*===================================*/
        #ifdef _ANSI_PROTOTYPES_
        int THD_rec_mutex_init (
            REC_MUTX_T    *rec_mutex)
        #else
        THD_rec_mutex_init (rec_mutex)
```

```
        REC_MUTX_T    *rec_mutex;
#endif
{
/***************************************
 *
 *    T H D _ r e c _ m u t e x _ i n i t    ( S U P E R S E R V E R )
 *
 ***************************************
 *
 * Functional description
 *
 ***************************************/

THD_mutex_init (rec_mutex->rec_mutx_mtx);
rec_mutex->rec_mutx_id = 0;
rec_mutex->rec_mutx_count = 0;
return 0;
}
/*=====================================*/
#ifdef _ANSI_PROTOTYPES_
int THD_rec_mutex_lock (
    REC_MUTX_T    *rec_mutex)
#else
THD_rec_mutex_lock (rec_mutex)
    REC_MUTX_T    *rec_mutex;
#endif
{
/***************************************
 *
 *    T H D _ r e c _ m u t e x _ l o c k    ( S U P E R S E R V E R )
 *
 ***************************************
 *
 * Functional description
 *
 ***************************************/
int    ret;

#ifdef WIN_NT
if (rec_mutex->rec_mutx_id == GetCurrentThreadId())
#endif
#ifdef NETWARE_386
if (rec_mutex->rec_mutx_id == GetThreadID())
#endif
    rec_mutex->rec_mutx_count++;
else
    {
    if (ret = THD_mutex_lock (rec_mutex->rec_mutx_mtx))
        return ret;
#ifdef WIN_NT
    rec_mutex->rec_mutx_id = GetCurrentThreadId();
#endif
#ifdef NETWARE_386
    rec_mutex->rec_mutx_id = GetThreadID();
#endif
    rec_mutex->rec_mutx_count= 1;
    }
return 0;
}
/*=====================================*/
#ifdef _ANSI_PROTOTYPES_
int THD_rec_mutex_unlock (
    REC_MUTX_T    *rec_mutex)
#else
THD_rec_mutex_unlock (rec_mutex)
    REC_MUTX_T    *rec_mutex;
#endif
```

```
{
/****************************************
 *
 *    T H D _ r e c _ m u t e x _ u n l o c k    ( S U P E R S E R V E R
 * )
 *
 ****************************************
 *
 * Functional description
 *
 ****************************************/
int    ret;

#ifdef WIN_NT
if (rec_mutex->rec_mutx_id != GetCurrentThreadId())
#endif
#ifdef NETWARE_386
if (rec_mutex->rec_mutx_id != GetThreadID())
#endif
     return FAILURE;
rec_mutex->rec_mutx_count--;

if (rec_mutex->rec_mutx_count)
     return 0;
else
     {
     rec_mutex->rec_mutx_id = 0;
     return THD_mutex_unlock (rec_mutex->rec_mutx_mtx);
     }
}
#endif  /* SUPERSERVER */
```

What is claimed is:

1. A client-server database system comprising:
   a database server storing a database;
   a database engine for performing database operations on said database in response to requests from clients, said database engine including an interface for receiving said requests;
   at least one stored procedure, operably coupled to said database engine, for invoking a pre-defined sequence of operations of the database engine, said at least one stored procedure having a data object shared concurrently by said clients; and
   a surrogate mutex for providing nested mutual exclusive access of said data object to a particular client in response to multiple, nested requests by said particular client for mutual exclusive access, said surrogate mutex encapsulating a system mutex from an operating system which does not support nested mutual exclusive access.

2. The system of claim 1, wherein said surrogate mutex comprises a record describing access to said data object, said record having an identifier field for storing an identity of said particular client, an identifier for said system mutex from an operating system, and having a count field for storing how many times said particular client has requested access to said data object.

3. The system of claim 2, further comprising a means for storing a value of 1 in said count field and granting said particular client access to said data object if said identifier field indicates no client is requesting access to said data object.

4. The system of claim 2, further comprising a means for placing said particular client in a sleep state until said identifier field indicates no other client has access to said data object if said identifier field does not specify said particular client.

5. The system of claim 2, further comprising a means for incrementing said count field if said identifier field specifies said particular client.

6. The system of claim 2, further comprising a means for decrementing said count field when said particular client finishes a requested access to said data object.

7. The system of claim 2, further comprising a means for allowing another client to access said data object once said count field reaches zero.

8. The system of claim 1, further comprising a table for maintaining said at least one stored procedure.

9. In a client-server database system including a server maintaining a database and a plurality of clients, a method for providing nested mutual exclusive access to a data object specified by a shared stored procedure, said shared stored procedure comprising user-specified data manipulation statements for instructing said server to perform a predefined sequence of operations on said database, the method comprising the steps of:
   allocating within storage a surrogate mutex including a record describing access to a data object specified by said shared stored procedure and shared concurrently by said plurality of clients, said record having an identifier field for storing an identity of a client, having a mutex field for accessing a system mutex from an operating system that does not allow nested mutual exclusive access, and having a count field for storing how many times said client has requested access to said data object;
   receiving at least one request from a particular client to access said data object; and
   for each said at least one request from said particular client to access said data object, performing one of the following:
      storing an identity of said particular client in said identifier field, storing a pointer to a system mutex that does not allow nested mutual exclusive access in said mutex field, storing a value of 1 in said count field, and granting said particular client access to said data object if said identifier field indicates no client has access to said data object,
      placing said particular client in a sleep state until said identifier field indicates no other client has access to said data object if said identifier field does not specify said particular client, and
      incrementing said count field if said identifier field specifies said particular client.

10. The method of claim 9, wherein said particular client requests access to said data object a plurality of times so that said particular client has nested access to said data object.

11. The method of claim 9, further comprising the step of decrementing said count field when said particular client finishes a requested access to said data object.

12. The method of claim 11, further comprising the step of allowing another client to access said data object once said count field reaches zero.

13. The method of claim 11, further comprising the step of storing a blank value in said identifier field indicating no client has access to said data object when said count field reaches zero.

14. The method of claim 9, further comprising the step of initializing said record by storing a blank value in said identifier field and storing a blank value in said count field.

15. The method of claim 13, wherein said blank value in said identifier field has a numeric value equal to 0.

16. The method of claim 13, wherein said blank value in said count field has a numeric value equal to 0.

17. The method of claim 9, wherein said identifier field stores an ID provided by said system.

18. The method of claim 9, further comprising the steps of:
   obtaining said system mutex from said system; and
   providing mutual exclusive access to said shared stored procedure through said system mutex.

19. The method of claim 9, wherein said system mutex is released back to said system when no other client requires access to said data object.

20. The method of claim 9, wherein said first program is suspended from execution when placed in said sleep state.

21. The method of claim 9, further comprising the step of allocating within storage a table for maintaining a plurality of shared stored procedures, each shared stored procedure instructing said server to perform a predefined sequence of operations comprising stored data manipulation statements operating on said database.

22. A computer program product for providing nested mutual exclusive access to a data object specified by a shared stored procedure in a client-server database system including a server maintaining a database and a plurality of clients, said computer program product comprising:
   a computer readable storage medium storing a computer program, said computer program comprising:
      code that allocates within storage a record describing access to a data object specified by said shared stored procedure storing user-specified data manipulation statements for instructing said server to perform a predefined sequence of data manipulation operations on said database and shared concurrently by said plurality of clients, said record having an identifier field for storing an identity of a client, having a mutex field for accessing a system mutex which does not support nested mutual exclusive access, and having a count field for storing how many times said client has requested access to said data object;

code that receives at least one request from a particular client to access said data object; and code that for each said at least one request from said particular client to access said data object, performs one of the following:

stores an identify of said particular client in said identifier field, stores in said mutex field a pointer to a system mutex that does not allow nested mutual exclusive access, stores a value of 1 in said count field, and granting said particular client access to said data object if said identifier field indicates no client has access to said data object, places said particular client in a sleep state until said identifier field indicates no other client has access to said data object if said identifier field does not specify said particular client, and increments said count field if said identifier field specifies said particular client.

23. The computer program product of claim 22, wherein said computer program allows said particular client nested access to said data object.

24. The computer program product of claim 22, further comprising code that decrements said count field when said particular client finishes a requested access to said data object.

25. The computer program product of claim 24, further comprising code that allows another client to access said data object once said count field reaches zero.

26. The computer program product of claim 24, further comprising code that stores a blank value in said identifier field indicating no client has access to said data object when said count field reaches zero.

27. The computer program product of claim 22, further comprising:

code that obtains said system mutex from said system; and code that provides mutual exclusive access to said shared stored procedure through said system mutex.

28. The computer program product of claim 27, wherein said system mutex is released back to said system when no other client requires access to said data object.

29. The computer program product of claim 22, further comprising code that allocates within storage a table for maintaining a plurality of shared stored procedures, each shared stored procedure instructing said server to perform a predefined sequence of operations on said database.

* * * * *